J. H. M. MICHON.
EXPANSIBLE WHEEL RIM.
APPLICATION FILED JULY 17, 1917.
1,278,367.
Patented Sept. 10, 1918.
2 SHEETS—SHEET 1.
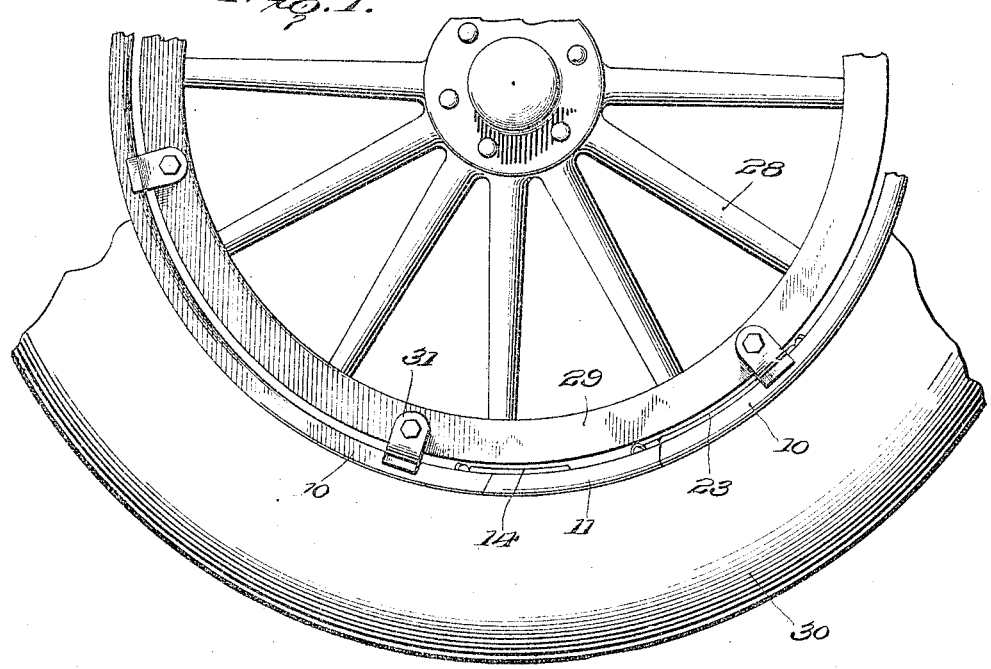
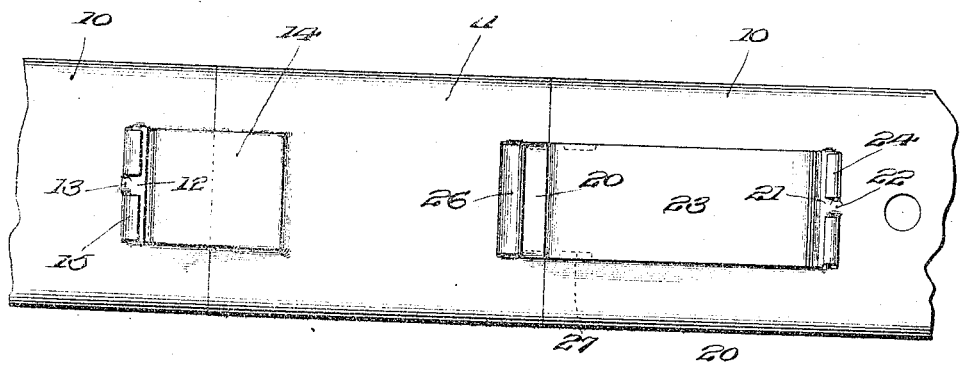
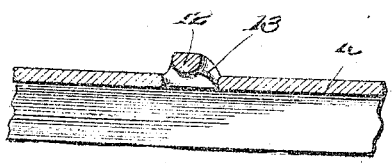
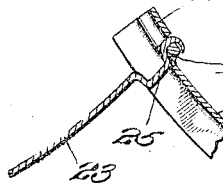
Inventor
Joseph H. M. Michon.
By
Attorneys

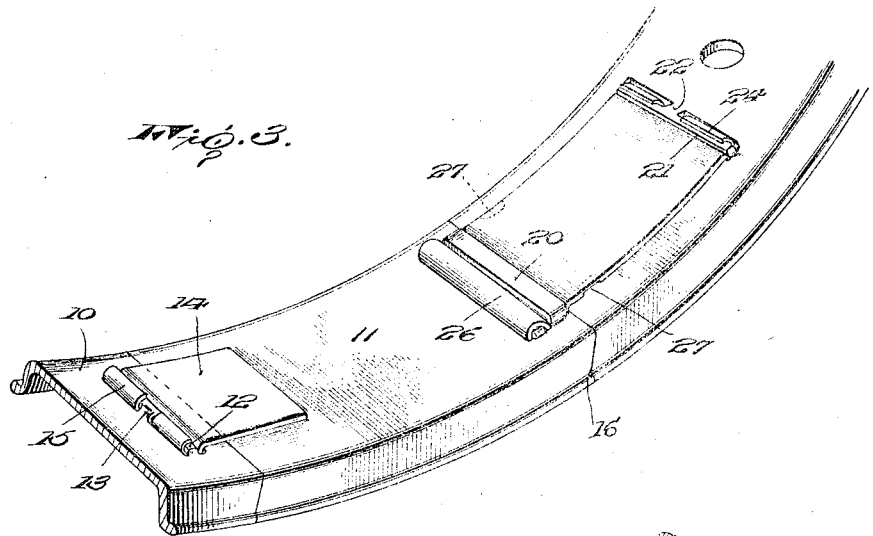
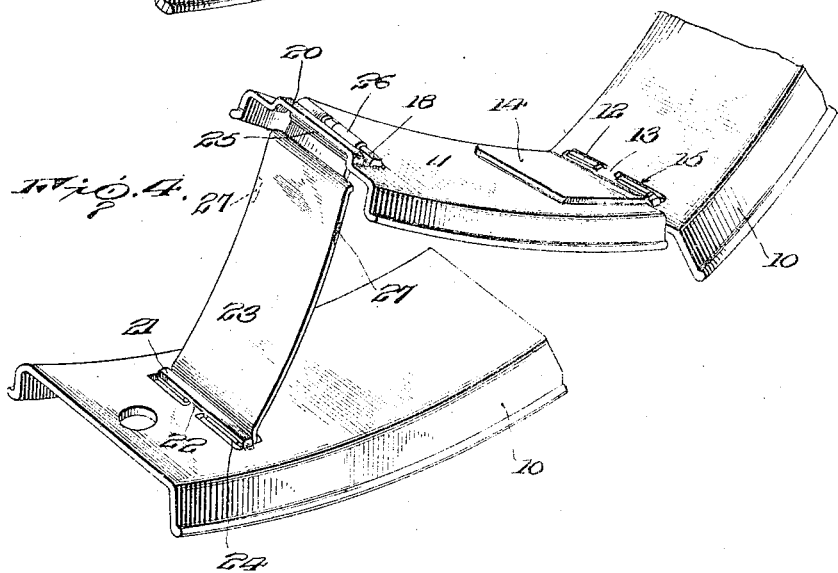
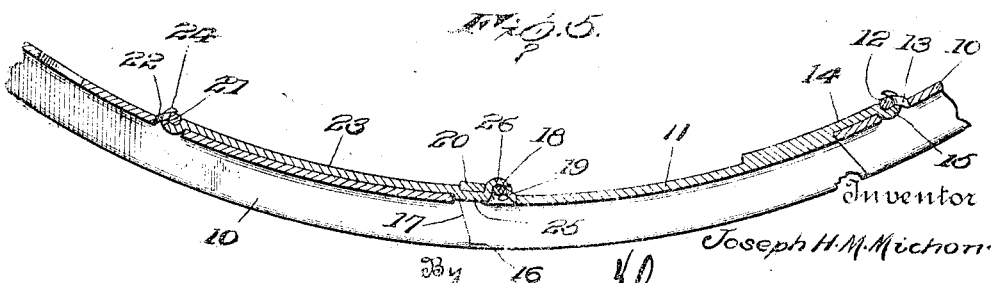

UNITED STATES PATENT OFFICE.

JOSEPH H. M. MICHON, OF WASHINGTON, DISTRICT OF COLUMBIA.

EXPANSIBLE WHEEL-RIM.

1,278,367.  Specification of Letters Patent.  Patented Sept. 10, 1918.

Application filed July 17, 1917. Serial No. 181,140.

*To all whom it may concern:*

Be it known that I, JOSEPH H. M. MICHON, a subject of the King of England, residing at Washington, in the District of Columbia, have invented certain new and useful Improvements in Expansible Wheel-Rims, of which the following is a specification.

This invention relates to an improved expansible wheel rim for motor vehicles and has as its primary object to provide a particularly simple construction whereby a tire may be placed upon or removed from the rim while at the same time the rim will prove thoroughly efficient in use.

The invention has as a further object to provide a rim employing a hinged rim section connected with the body of the rim by a link plate coöperating with the said rim section to provide a toggle operable for expanding the rim body and shifting the said rim section to active position between the ends thereof.

The invention has as a further object to provide a construction wherein the joint between the free end of the hinged rim section and the adjacent end of the rim body will be formed to provide a lock for holding the hinged rim section against accidental inward displacement.

And a still further object of the invention is to provide a construction wherein the hinged rim section as well as the link plate may, without the use of any tools, be readily displaced or detached from the body of the rim so that these parts may be carried in stock to be applied by the user of the rim at any time it might become necessary to renew the said parts.

Other and incidental objects will appear as the description proceeds and in the drawings wherein I have illustrated the preferred embodiment of the invention and wherein similar reference characters designate corresponding parts throughout the several views:

Figure 1 is a fragmentary side elevation showing my improved wheel rim in connection with a conventional type of wheel and tire, Fig. 2 is a fragmentary plan view of the inner face of the rim and showing the hinged rim section in normal active position between the ends of the body of the rim, Fig. 3 is a fragmentary perspective view particularly illustrating the manner in which the hinged rim section is connected with the rim body, Fig. 4 is a fragmentary perspective view showing the hinged rim section swung to inactive position, this view particularly illustrating the hinge link plate employed to coact with the hinged rim section to form a toggle, Fig. 5 is a fragmentary longitudinal sectional view particularly illustrating the locking joint between the free end of the hinged rim section and the adjacent end of the rim body, Fig. 6 is a fragmentary sectional view showing the type of pivot bar provided for supporting the link plate as well as for supporting the hinged rim section, and Fig. 7 is a fragmentary sectional view illustrating the manner in which the link plate may be detached.

In carrying out the invention, I employ a split resilient rim body 10 with which is arranged to coact a rim section 11 adapted to fit between the ends of the rim body. The rim may be of any approved character for receiving a pneumatic tire. Struck from one end of the rim body is an inwardly offset pivot bar 12, the sides and inner face of which are rounded while the outer face of the said bar is flat. The bar 12 is arranged to extend transversely with respect to the rim and, as particularly shown in Figs. 2 and 6, is braced intermediate its ends by a supporting web 13 extending between the said bar and the rim and preferably formed integral therewith. Mounted upon the inner side of the rim section 11 at one extremity thereof is a hinge plate 14. This hinge plate may, as particularly shown in Fig. 5 of the drawings, be integrally formed with the said section and at its outer extremity is provided with spaced arcuate hinge lugs 15 embracing the pivot bar 12 at opposite sides of the web 13 and pivotally connecting the rim section with the rim body. In this connection, it will be noted that the rounded faces of the pivot bar are so arranged that when the hinged rim section is swung inwardly, the hinge lugs 15 will engage the said faces of the pivot bar for freely supporting the rim section.

As will now be best observed upon reference to Fig. 5 of the drawings, the free end of the hinged rim section as well as the adjacent end of the rim body are formed, at the side margins thereof, with straight radial shoulders 16 from the inner ends of which the meeting terminals of the rim body and section are provided with sloping edges 17. This provides a construction whereby when the hinged rim section is moved to active position between the ends of the body of the rim, the sloping edges 17 of the rim section and rim body will ride over each other and permit the rim section to be easily shifted into place. However, after the hinged rim section has been so shifted, the shoulders 16 of the said section and rim body will engage with each other to lock the hinged rim section against accidental inward displacement, it being observed in this connection, that the hinged rim section will be tightly held between the ends of the rim body by the resilient action of the body of the rim.

Struck from the free extremity of the hinged rim section 11 is an inwardly offset pivot bar 18 extending transversely of the said section. This pivot bar 18 is identical with the pivot bar 12, being provided with an outer flat face. Bracing the said pivot bar intermediate its ends is, as particularly shown in Fig. 5, a supporting web 19 similar to the web 13 of the bar 12. In advance of the pivot bar 18, the hinged rim section is formed with a transversely extending inwardly offset locking web or strip 20 of a length substantially equal to the length of the bar. At a point spaced from the adjacent end thereof, the rim body is also provided with an inwardly offset pivot bar 21. This bar, as in the instance of the bar 18, is also identical with the pivot bar 12 and is provided with an outer flat face. Bracing the said bar at a point intermediate its ends, is a supporting web 22 similar to the web 13 of the bar 12.

Connecting the free extremity of the hinged rim section with the adjacent end of the rim body is a link plate 23. This plate, at one end thereof, is formed with slightly offset arcuate hinge lugs 24 spaced apart to engage around the pivot bar 21 at opposite sides of the supporting web 22 for the said bar. At its opposite extremity, the link plate 23 is formed with a transversely extending channel or socket 25 and from the said channel the plate is thence provided with spaced arcuate hinge lugs 26 slightly offset from the plate in a direction opposite to the lugs 24 and arranged to engage around the pivot bar 18 at opposite sides of the supporting web 19 therefor. The plate 23 thus forms a direct pivot connection between one end of the rim body and the free end of the hinged rim section.

Attention is now directed to the fact that the link plate 23, is, as particularly shown in Fig. 4 of the drawings, arranged to coact with the hinged rim section to in effect provide a toggle. Consequently, by pressing outwardly upon the free end of the said rim section, the said toggle will act to spread or expand the body of the rim so that the hinged rim section may thus be easily swung to active position fitting between the ends of the rim body. Since considerable stress will be exerted against the pivot bars 12, 18 and 21, when the hinged rim section is thus moved to spread the ends of the rim body, the supporting webs for the said bars are provided to prevent the breaking or bending of the said bars.

When the hinged rim section is disposed in active position, it will be noted upon reference to Figs. 3 and 5 of the drawings, that the hinge plate 14 will lie flat against the inner face of the rim. Moreover, the link plate 23 will also lie flat against the inner face of the rim with the locking strip 20 of the rim section snugly fitting within the socket 25 of the link plate. This strip will thus coact with the side walls of the said socket to bind the link plate longitudinally between the hinged rim section and the pivot bar 21 to thus overcome any looseness between the parts and consequent rattling. Furthermore, since the hinged rim section will be locked against accidental displacement by the shoulders 16, the strip 20 in being arranged to overlie the free extremity of the link plate will tend to lock the said plate against the rim. However, in order that the plate may be easily swung upwardly to displace the hinged rim section, the said plate is provided adjacent its free ends with up-struck lips 27 at the side edges thereof. A screw driver or other tool may be engaged beneath these lips for prying the plate upwardly and consequently swinging the hinged rim section from between the ends of the rim body. I therefore provide a particularly simple arrangement whereby the tire may be easily mounted upon or removed from the rim.

Should it be desired to remove the hinged rim section, this result may be readily accomplished by first swinging the said plate to inactive position, as illustrated in Fig. 4, and then compressing the rim body to swing the link plate 23 rearwardly until the hinge lugs 24 of the said plate are arranged to engage around the smaller diameter of the pivot bar 12. In other words, the link plate 23 is swung to a position with the lugs 24 thereof overlying the outer flat face of the said pivot bar. When so disposed, the inner end of the plate may then be shifted transversely of the bar to disengage the said pivot lugs therefrom. After the inner end of the link plate has thus been freed, the lugs 26 thereof may be swung upon the pivot bar 18, in like manner, to a position with the free ends of the lugs confronting, as shown in detail in Fig. 7 of the drawings, the flat face of the said bar. The lugs may then be shifted transversely upon the bar to entirely free the link plate. By following the same procedure, the hinged rim section is swung upon the pivot bar 12 to a position with the said lugs engaging around the smaller diameter of the bar. The lugs may then be shifted transversely of the bar to disengage the rim section. It will accordingly be seen that the hinged rim section and the link plate may, without the use of any tools, be disengaged from the rim body as well as disengaged from each other. Consequently, these parts may be carried in stock and substituted by the user of the rim for renewing either of the said parts should they become broken.

In Fig. 1 of the drawings, I have shown my improved rim in connection with a conventional type of motor vehicle wheel 28 having a felly 29. The rim is further shown as equipped with a conventional type of pneumatic tire 30. As illustrated in this figure, the rim is removably fitted upon the wheel and is engaged by side wedges 31, in the usual manner, for holding the rim in position. It will be noted that when the rim is thus mounted upon the wheel, the link plate 23 will closely confront the felly which will thus prevent the inward displacement of the said link plate and positively overcome any possibility of the displacement of the hinged rim section. The rim is, of course, provided at some suitable point, as shown in Figs. 3 and 4, with a suitable opening for receiving the valve stem of the tire.

It will therefore be seen that I provide a particularly efficient construction for the purpose set forth and a rim which will alleviate the present troublesome difficulties experienced in the mounting and dismounting of pneumatic tires upon the rims therefor.

Having thus described the invention, what is claimed as new is:

1. A device of the character described including a split rim body, a rim section, a pivot bar carried by one extremity of the rim body, a bracing web for the said bar, a hinge plate having complemental lugs engaging the said bar at opposite sides of said web and pivotally connecting the rim section with the said extremity of the rim body, the rim section being movable to a position for disengaging the said lugs from the said bar, and means swingingly connecting the free extremity of the rim section with the rim body adjacent its opposite extremity, the said section being movable to spread the extremities of the body of the rim and fit between the ends thereof.

2. A device of the character described including a split rim body, a rim section hinged at one extremity to one extremity of the rim body, a link plate swingingly connecting the free extremity of the said section with the rim body adjacent its opposite extremity and provided with a socket, the rim section being movable to spread the extremities of the body of the rim and fit in active position between the ends thereof, and means carried by the said rim section to engage within the said socket for locking the link plate against longitudinal movement in the active position of the said rim section.

3. A device of the character described including a split rim body, a pivot bar struck from one extremity thereof, a rim section, a hinge plate carried by the rim section and formed with a lug detachably engaging said bar and hingedly connecting the said rim section with the rim body, a pivot bar struck from the free extremity of the rim section, a pivot bar struck from the rim body adjacent its opposite extremity, and a link plate having lugs detachably engaging said last mentioned pivot bars and swingingly connecting the free extremity of the said rim section with the said last mentioned extremity of the rim body, the rim section being movable to spread the extremities of the body of the rim and fit between the ends thereof.

4. A device of the character described including a split rim body normally contracted, and a rim section hinged to the rim body and movable to expand the body of the rim and fit between the extremities thereof, the said rim section being movable to a position to permit free disengagement from the rim body when the rim is contracted and being locked against accidental displacement when the rim is expanded.

5. A device of the character described including a split rim body, a rim section hinged at one extremity to one extremity of the rim body, and means hingedly connecting the opposite extremity of the rim section with the rim body adjacent its opposite extremity and movable with the rim section for expanding the rim body and shifting the rim section from a position in angular relation to the rim body to a position fitting between the ends thereof, the said means being movable to permit free disengagement from the rim body and rim section in the angular position of the rim section and being locked against accidental displacement when the rim is expanded.

6. A device of the character described including a split rim body, a rim section hinged at one extremity to one extremity of the rim body, a pivot bar carried by the free extremity of the said rim section, and a link member swingingly connecting the free extremity of the said rim section with the rim body adjacent its opposite extremity and pivotally engaged with said bar, the said link member being movable with the said rim section to spread the extremities of the body of the rim and shift the rim section from a position in angular relation to the rim body to a position fitting between the ends thereof and being movable to permit free disengagement from the said pivot bar in the angular position of the rim section but locked against accidental displacement from said bar when the rim is expanded.

7. A device of the character described including a split rim body, a rim section hinged to one extremity of the rim body, and a link member hingedly connecting the free extremity of the rim section with the rim body adjacent its opposite extremity, the link member and rim section being movable to expand the rim and shift the rim section from a position in angular relation to the rim body to a position between the ends thereof and being movable to permit free disengagement from the rim and from each other in the angular position of the rim section.

8. A device of the character described including a split rim body, a rim section, a link member, pivot bars carried by the rim body and rim section and provided with flat faces, and lugs carried by the rim section and link member and engaging said pivot bars for swingingly connecting one extremity of the rim section with one extremity of the rim body and swingingly connecting the free extremity of the rim section with the rim body adjacent its opposite extremity, the rim section being movable to expand the rim and shift to a position fitting between the ends of the rim body with the said rim section and link member locked against accidental displacement and the link member and rim section being movable when the rim is contracted to a position with the free ends of said lugs confronting the flat faces of the said pivot bars to permit the free disengagement of the link member and rim section from the rim body as well as from each other.

In testimony whereof I affix my signature.

JOSEPH H. M. MICHON. [L. S.]